(12) United States Patent
Sugawara et al.

(10) Patent No.: US 6,925,045 B2
(45) Date of Patent: Aug. 2, 2005

(54) OPTICAL PICKUP HAVING TWO WAVELENGTH LASER AND SIMPLE STRUCTURE

(75) Inventors: Masayoshi Sugawara, Yamagata (JP); Hiroshi Sanpei, Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 559 days.

(21) Appl. No.: 09/835,205

(22) Filed: Apr. 13, 2001

(65) Prior Publication Data

US 2002/0024918 A1 Feb. 28, 2002

(30) Foreign Application Priority Data

Apr. 13, 2000 (JP) ........................................ 2000-111988

(51) Int. Cl.$^7$ ................................................. G11B 7/00
(52) U.S. Cl. ........................... 369/112.01; 369/112.05; 369/112.21
(58) Field of Search ....................... 369/44.37, 112.05, 369/44.11, 44.14, 44.23, 44.26, 44.27, 44.41, 112.01, 112.02, 112.03, 112.04, 112.06, 112.1, 112.15, 112.16, 112.21, 112.29

(56) References Cited

U.S. PATENT DOCUMENTS

| | | | | |
|---|---|---|---|---|
| 5,986,998 A | * | 11/1999 | Park | 369/121 |
| 6,043,911 A | * | 3/2000 | Yang | 359/15 |
| 6,084,843 A | * | 7/2000 | Abe et al. | 369/112.07 |
| 6,091,691 A | * | 7/2000 | Yoo et al. | 369/112.11 |
| 6,236,633 B1 | * | 5/2001 | Chang et al. | 369/112.1 |
| 6,358,764 B1 | * | 3/2002 | Nemoto | 438/22 |
| 6,480,456 B1 | * | 11/2002 | Kawamura et al. | 369/120 |
| 6,507,009 B1 | * | 1/2003 | Ohnishi et al. | 250/201.2 |
| 6,646,975 B1 | * | 11/2003 | Uchizaki et al. | 369/121 |

FOREIGN PATENT DOCUMENTS

| | | |
|---|---|---|
| JP | 11-144284 | 5/1999 |
| JP | 11-149652 | 6/1999 |

* cited by examiner

*Primary Examiner*—Thang V. Tran
(74) *Attorney, Agent, or Firm*—Frishauf, Holtz, Goodman, & Chick, P.C.

(57) ABSTRACT

In an optical pickup used in a DVD player, a photo detector has a predetermined photo sensing area pattern for detecting a returning laser beam from an optical disc. The returning laser beam is originated from a first laser beam or a second laser beam. The first and the second laser beams are alternatively emitted from a two wavelength laser having first and second light sources. Either the first laser beam or the second laser beam travels to the optical disc through a grating, a polarizing beam splitter, a collimating lens, a rising mirror, and an object lens and is reflected by the optical disc. The reflected laser beam reflected from the optical disc travels to the photo detector as the returning laser beam through the object lens, the rising mirror, the collimating lens, and the polarizing beam splitter. The predetermined photo sensing area pattern enables the photo detector to detect the returning laser beam regardless of the origin of the returning laser beam.

2 Claims, 4 Drawing Sheets

US 6,925,045 B2

OPTICAL PICKUP HAVING TWO WAVELENGTH LASER AND SIMPLE STRUCTURE

BACKGROUND OF THE INVENTION

This invention relates to an optical pickup for use in an optical disc driver such as a DVD player and, in particular, to an optical pickup which has a two wavelength laser for emitting two laser beams with different wavelengths.

As is well known in the art, a DVD (Digital Versatile or video Disc) player can plays not only a DVD but also a CD (Compact Disc). To permit playing both of the DVD and the CD, the DVD player has a special optical pickup with a special structure. The special optical pickup has two laser diodes to alternatively emit a first reading laser beam for the DVD or a second reading laser beam for the CD. The first reading laser beam is different from the second reading in wavelength. That is, the first reading beam has a shorter wavelength of about 650 nm while the second reading laser beam has a longer wavelength of about 780 nm. The special optical pickup is called two-wavelength correspondence type optical pickup.

A conventional two-wavelength correspondence type optical pickup comprises the first and the second laser diodes as mentioned above. The first and the second laser diodes are apart from each other and produce the first and the second reading laser beams, respectively. The first laser diode is called a DVD-LD while the second diode is called a CD-LD.

The optical pickup further comprises an optical system to lead the first laser beam from the first laser diode to an optical disc loaded in an optical disc player to which the optical pickup is attacked. The optical system also leads the second laser beam from the second laser diode to the optical disc. In addition, the optical system leads a reflected light beam reflected from the optical disc to a photo detector.

The conventional optical pickup needs two gratings and two polarizing beam splitters to correspond to two of the laser diodes in the optical system, because the laser diodes are relatively distant from each other. Accordingly, the conventional optical pickup has a problem that it has a large number of components and a complicated structure.

SUMMARY OF THE INVENTION

It is therefore an object of this invention to provide an optical pickup having a simple structure.

It is another object of this invention to provide an optical pickup which can be easily assembled.

It is still another object of this invention to provide an optical pickup which is inexpensive.

It is further still another object of this invention to provide an optical pickup which is reliable.

Other objects of this invention will become clear as the description proceeds.

On describing the gist of an aspect of this invention, it is possible to be understood that an optical pickup is for applying a reading laser beam to an optical disc and for detecting a returning laser beam reflected from the optical disc.

According to one aspect of this invention, the optical pickup comprises a two wavelength laser having first and second light sources to emit first and second laser beams, respectively, in a first direction for alternatively applying the first laser beam or the second laser beam to the optical disc as the reading laser beam. The first and the second laser beams have optical axes parallel to a first direction and are different from each other in wavelength. A polarizing beam splitter is disposed on a side of the first direction against the two wavelength laser and partially passes or reflects the reading laser beam from the two wavelength laser to lead the reading laser beam to the optical disc. The polarizing beam splitter also partially reflects or passes the returning laser beam which is formed by reflecting the reading laser beam with the optical disc to lead the returning laser beam in a second direction different from the first direction. A photo detector is disposed on a side of the second direction against the polarizing beam splitter and has a predetermined photo sensing area pattern. The photo detector detects the returning laser beam traveling in the second direction from the polarizing beam splitter regardless of whether the returning laser is originated from the first laser beam or the second laser beam.

Figure 1:
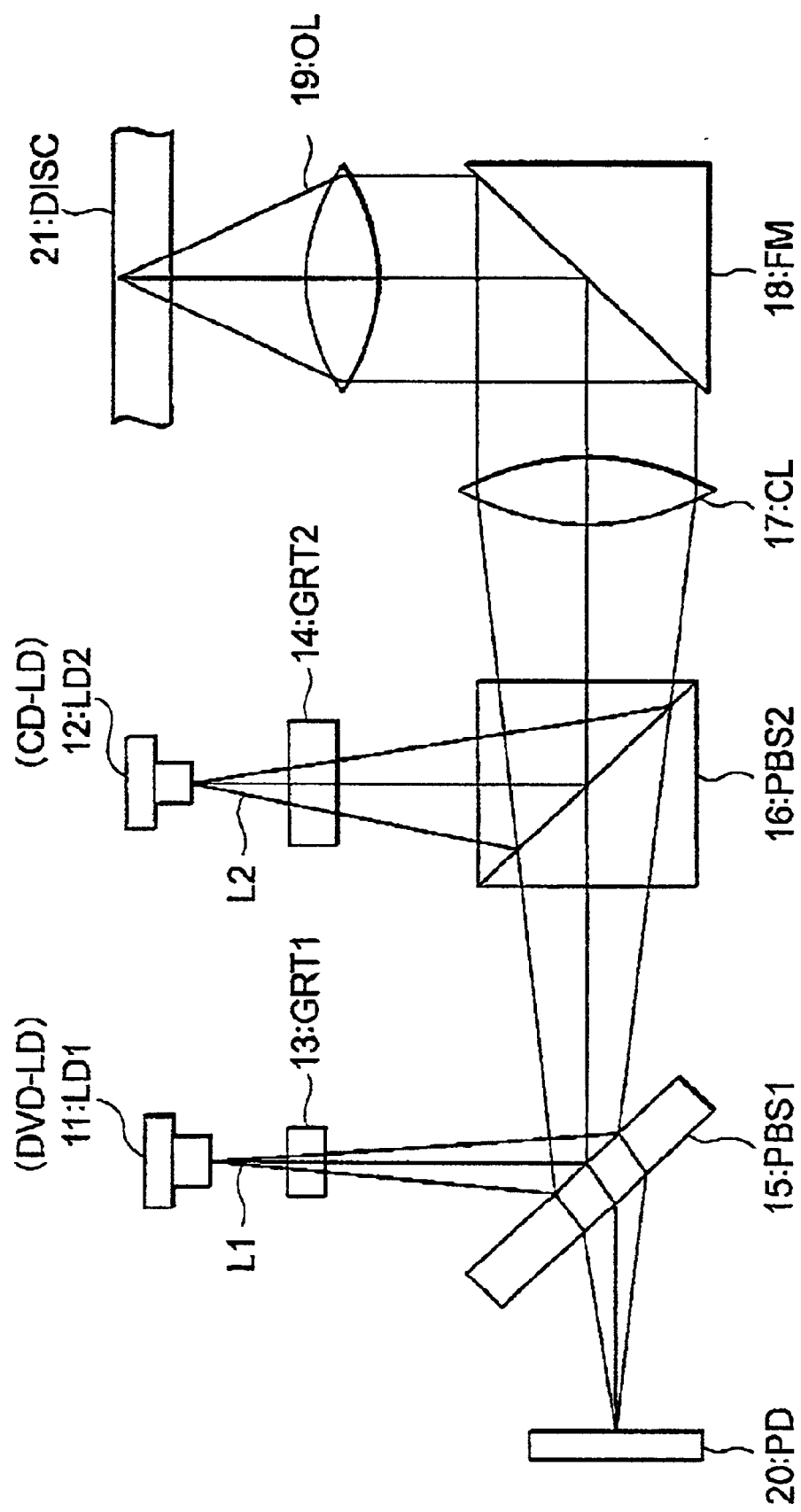
FIG. 1 is a schematic view of a conventional optical pickup.
Figure 2:
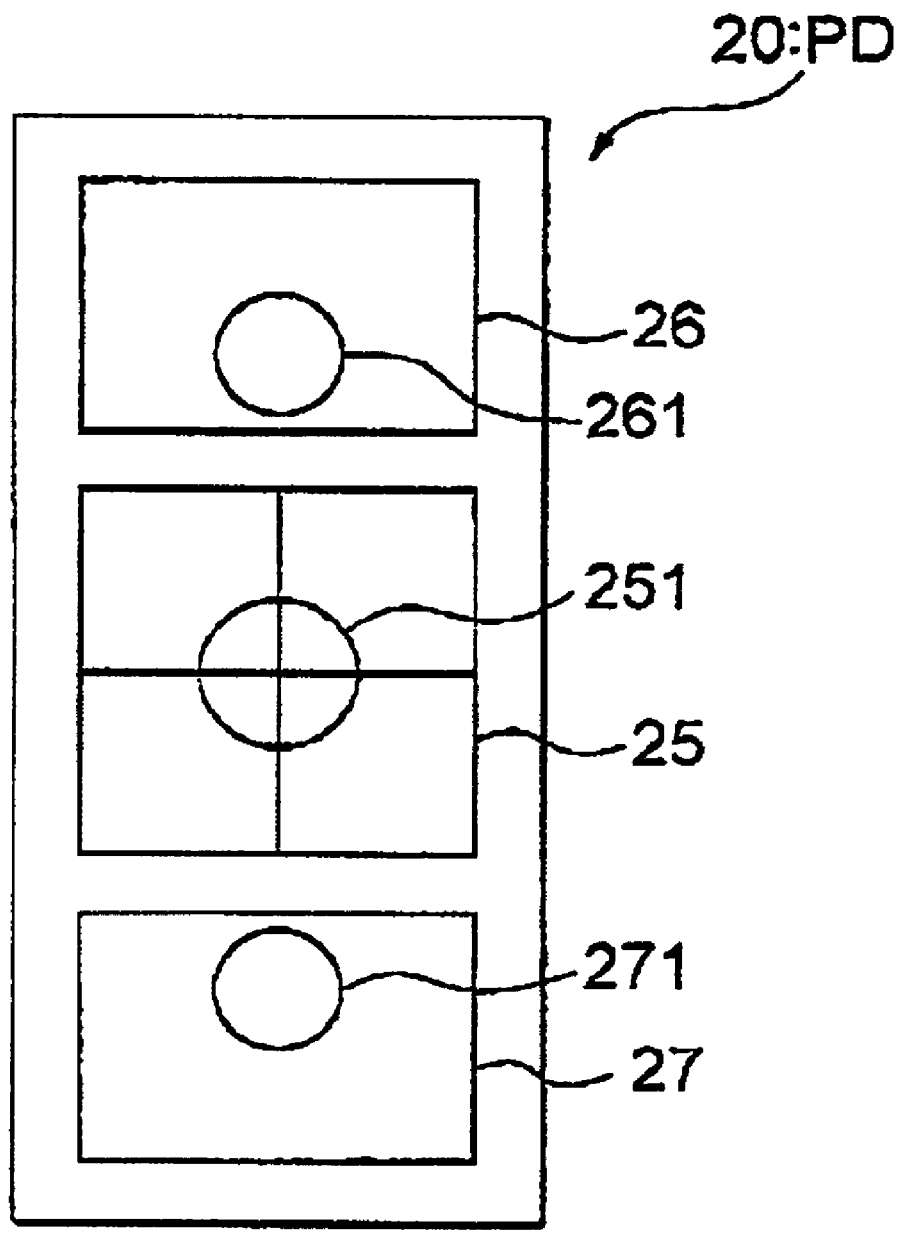
FIG. 2 is a schematic view of a photo sensing area pattern of a photo detector used in the conventional optical pickup of FIG. 1.

DESCRIPTION OF THE PREFERRED EMBODIMENT:

Referring to FIGS. 1 and 2, description will be at first directed to a conventional optical pickup for a better understanding of this invention.

FIG. 1 is a system construction diagram of an optical system of the conventional optical pickup used in an optical disc driver such as a DVD driver.

In FIG. 1, the optical pickup comprises first and second laser diodes (LD1) 11 and (LD2) 12, first and second gratings (GRT1) 13 and (GRT2) 14, first and second polarizing beam splitters (PBS1) 15 and (PBS2) 16, a collimating lens (CL) 17, a rising mirror (or a 45 degree mirror) (FM) 18, an object lens (OL) 19, and a photo detector (PD) 20.

The first laser diode 11 emits a first reading laser beam (L1) having a first optical axis and a wavelength of about 650 nm for playing a DVD (Digital Versatile or video Disc) and is called a DVD-LD. The second laser diode 12 emits a second reading laser beam (L2) having a second optical axis and a wavelength of about 780 nm for playing a CD (Compact Disc) and is called a CD-LD. The first laser diode 11 and the second laser diode 12 are arranged so as to leave a predetermined interval between them and so that the first optical axis and the second optical axis are parallel to each other and extend in a first direction (or a vertical direction of FIG. 1).

The first grating 13 divides the first laser beam L1 from the first laser diode 11 into three first divided laser beams (i.e. a first central beam and two first side beams located on both sides of said first central beam). Similarly, the second grating 14 divides the second laser beam L2 from the second laser diode 12 into three second divide laser beams (i.e. a second central beam and two second side beams located on both sides of said second central beam).

The first polarizing beam splitter 15 reflects fractions of the first divided laser beams in a direction of the second polarizing beam splitter 16. Moreover, the first polarizing beam splitter 15 passing reflected laser beams (reflected from an optical disc 21) transmitted from the second polarizing beam splitter 16 therein as mentioned later. Here, the first polarizing beam splitter 15 substantially has a reflectance of 50% and a transmissivity of 50% for light having a wavelength of about 650 nm and a transmissivity of 100% for light having a wavelength of about 780 nm.

The second polarizing beam splitter 16 reflects fractions of the second divided laser beams in a direction of the collimating lens 17. In addition, the second polarizing beam splitter 16 passing the first divided laser beams and the reflected beams between the first polarizing beam splitter 15 and the collimating lens 17 as mentioned below. Here, the second polarizing beam splitter 16 substantially has a transmissivity of 100% for the light having the wavelength of about 650 nm and a reflectance of 50% and a transmissivity of 50% for the light having the wavelength of about 780 nm.

The first and the second laser diodes 11 and 12, the first and the second gratings 13 and 14, and the first and the second polarizing beam splitters 15 and 16 are arranged so that optical axes of the first divided laser beams coincide with that of the second divided laser beams between the second polarizing beam splitters 15 and the collimating lens 17.

The collimating lens 17 collimates the first and the second divided laser beams from the second polarizing beam splitter 16 to form parallel laser beams. The rising mirror 18 reflects the parallel laser beams from the collimating lens 17 at a right angle to lead the parallel laser beams to the object lens 19. The object lens 19 condenses the parallel laser beams from the rising mirror 18 to form condensed laser beams. The condensed laser beams are applied to a recording layer of the optical disc.

The optical disc 21 reflects the condensed laser beams according to pits formed in the recording layer thereof and forms the reflected beams. The reflected beams from the optical disc 21 travel to the photo detector 20 through the object lens 19, the rising mirror 18, the collimating lens 17, the second polarizing beam splitter 16 and the first polarizing beam splitter 15. The reflected beams passed through the first polarizing beam splitter 15 have a second direction (or a horizontal direction of FIG. 1) which is perpendicular to the first direction.

The photo detector 20 has enough photosensitivity to detect the reflected beams even if total luminous energy of the reflected beams is equal to or smaller than 25% of that of the first laser beam L1 or the second laser beam L2.

Next, the description will be made about an operation of the optical pickup of FIG. 1. A case where the optical disc 21 is a DVD is first, then a case where the optical disc 21 is a CD.

When the optical disc 21 is the DVD, the first laser diode 11 is in an operation state while the second laser diode 12 is not in an operation state. Accordingly, the first laser diode 11 alone emits the first laser beam L1.

The first laser beam L1 emitted from the first laser diode 11 travels to the first grating 13. The first grating 13 divides the first laser beam L1 into the first divided laser beams.

The first divided laser beams travel to the first polarizing beam splitter 15. The first polarizing beam splitter 15 reflects the fractions of the first divided laser beams. That is, each of the first divided laser beams is partly reflected by the first polarizing beam splitter 15 and partly passes through the first polarizing beam splitter 15. Because the first polarizing beam splitter 15 has the reflectance of 50% and the transmissivity of 50% for the light having the wavelength of about 650 nm as mentioned above, the luminous power of the first divided laser beams reflected from the first polarizing beam splitter 15 falls 50%.

The first divided laser beams reflected from the first polarizing beam splitter 15 travel to the collimating lens 17 through the second polarizing beam splitter 16. Inasmuch as the second polarizing beam splitter 16 has the transmissivity of 100% for the light having the wavelength of about 650 nm as mentioned above, all the first divided laser beams which reach to second polarizing beam splitter 16 pass through the second polarizing beam splitter 16.

The collimating lens 17 collimates the first divided laser beams passing through the second polarizing beam splitter 16. The collimated first divided laser beams collimated by the collimating lens 17 are reflected by the rising mirror 18 and condensed by the object lens 19 to be applied to the recording layer of the optical disc 21.

The recording layer of the optical disc 21 reflects the condensed laser beams condensed by the object lens 19 according to the pits and forms first reflected laser beams. The first reflected laser beams travel to the photo detector 20 through the object lens 19, the rising mirror 18, the collimating lens 17, the second polarizing beam splitter 16, and the first polarizing beam splitter 15. Because the first polarizing beam splitter 15 has the reflectance of 50% and the transmissivity of 50% for the light having the wavelength of about 650 nm, all the luminous power of the first reflected laser beams falls 50%. That is, the luminous power of the first reflected laser beams is equal to 25% of that of the first laser beam L1.

Next, the description is directed to the case where the optical disc is the CD.

When the optical disc 21 is the CD, the second laser diode 12 is in the operation state while the first laser diode 11 is not in an operation state. Accordingly, the second laser diode 12 alone emits the second laser beam L2.

The second laser beam L2 emitted from the second laser diode 12 travels to the second grating 14. The second grating 14 divides the second laser beam L2 into the second divided laser beams.

The second divided laser beams travel to the second polarizing beam splitter 16. The second polarizing beam splitter 16 reflects the fractions of the second divided laser beams. That is, each of the second divided laser beams is partly reflected by the second polarizing beam splitter 16 and partly passes through the second polarizing beam splitter 16. Because the second polarizing beam splitter 16 has the reflectance of 50% and the transmissivity of 50% for the light having the wavelength of about 780 nm as mentioned above, the luminous power of the second divided laser beams reflected from the second polarizing beam splitter 16 falls 50%.

The second divided laser beams reflected from the second polarizing beam splitter 16 are applied to the optical disc 21 through the collimating lens 17, the rising mirror 18, and the object lens 19 like the first divided laser beams passing through the second polarizing beam splitter 16.

The optical disc 21 reflects the second divided laser beams and forms second reflected laser beams. The second reflected laser beams travel to the photo detector 20 like the first reflected laser beams through the object lens 19, the rising mirror 18, the collimating lens 17, the second polarizing beam splitter 16, and the first polarizing beam splitter 15. Because the second polarizing beam splitter 16 has the reflectance of 50% and the transmissivity of 50% for the light having the wavelength of about 780 nm, the luminous power of the second reflected laser beams passing through the second polarizing beam splitter 16 falls 50%. That is, the luminous power of the second reflected laser beams is equal to 25% of that of the second laser beam L2. The first polarizing beam splitter 15 passes the second reflected laser beams through therein without reflecting them.

In the optical disc player, focusing control and tracking control of the optical pickup are indispensable for playing the optical disc. To carry the focusing control and the tracking control, it is necessary to obtain a focus error signal and a tracking error signal from the reflected laser beams.

The first (or the second) reflected laser beams includes three laser beams because the first (or second) laser beam L1 (or L2) is divided into three divided laser beams by the first (or second) grating 13 (or 14). The central one corresponding to the first (or second) center beam is used for producing both of a reading signal and the focus error signal. The remaining two corresponding to the first (or second) side beams are used for producing the tracking error signal.

As illustrated in FIG. 2, the photo detector 20 comprises a center photodiode 25 and side photodiodes 26 and 27 arranged on both sides of the center photodiode 25 at predetermined intervals.

The center photodiode 25 has four sensing areas each of which serves as one photodiode and is called a fourfold photodiode. The center photodiode receives the center beam and produces first through fourth detecting signals in response to the center beam.

The side photodiodes 26 and 27 receive the side beams and produce fifth and sixth detecting signals in response to the side beams, respectively.

When the focusing control is made so that the condensed laser beams are exactly condensed on the recording layer of the optical disc 21, a beam spot 251 formed on the center photodiode 25 has a circle in shape as shown in FIG. 2. In other words, when a distance between the object lens 19 and the optical disc 21 is equal to a predetermined value, the beam spot 251 on the center photodiode 25 has a perfect circle in shape. On the other hand, when the condensed laser beams are not condensed on the recording layer of the optical disc 21, the beam spot formed on the center photodiode 25 has an ellipse in shape. In other words, the optical system makes the beam spot 251 thin when the distance between the object lens 19 and the optical disc 21 increases or decreases from the predetermined value.

When the tracking control is made so that the condensed laser beams exactly trace a recording track of the recording layer, beam spots 261 and 271 are entirely on the side photodiodes 26 and 27, respectively, as shown in FIG. 2. On the other hand, when the condensed laser beams do not exactly trace a recording track of the recording layer, the beam spot 261 (or 271) is partially out of the photodiode 26 (or 27), though the beam spot 271 (or 261) is entirely on the photodiode 27 (or 26).

The optical disc driver provides a signal processing circuit (not shown) including a first processing unit and a second processing unit. The first processing unit produces the reading signal and the focus error signal on the basis of the first through the fourth detecting signals supplied from the center photodiode 25. The second processing unit produces the tracking signal on the basis of the fifth and the sixth detecting signals supplied from the side photodiodes 26 and 27.

As mentioned above, the conventional optical pickup has the first laser diode for the DVD and the second laser diode for the CD. The first laser diode is relatively distant from the second laser diode. Accordingly, the optical pickup has a problem that it has complicated constitution because it must have two gratings and two polarizing beam splitters to correspond to the laser diodes.

Japanese Unexamined Patent Publication No. 11-144284 discloses a one-chip laser diode which has two laser diodes. The one-chip laser diode is used in an optical pickup of a DVD player to reduce cost and components of the optical pickup. However, the optical pickup has two photo detectors which are separated from each other. One of the photo detectors is integrated into the one-chip laser diode while the other is independent of the one-chip laser diode. Nothing is made about a photo detector for detecting two laser beam sets corresponding to the two laser diodes in the above mentioned document.

Another one-chip laser diode is disclosed in Japanese Unexamined Patent Publication No. 11-149652. The one-chip laser is integrated into an optical pickup unit together with a photo detector for detecting two laser beam sets corresponding to two laser diodes included in the one-chip laser. However, the one-chip laser has an impractical structure that a distance between emitting points of the two laser diodes is equal to a mere 10 $\mu$m. In addition, the optical pickup including the one-chip laser diode does not have gratings for dividing laser beams supplied from the laser diodes.

Still another one-chip laser diode is disclosed in the above mentioned document (No. 11-149652). The one-chip laser diode has a practical structure that a distance between emitting points of two laser diodes is equal to a 200–500 $\mu$m. In this case, laser beams emitted by the two laser diodes travel on different optical paths different from each other. Accordingly, the laser beams can not be detected by a conventional photo detector. However, nothing is made about a concrete means for enabling a photo detector to detect the laser beams travelling on the different optical paths.

Additionally, the above mentioned document (No. 11-149652) discloses a hologram element for perpendicularly applying the laser beams to the optical disc. However, the hologram element makes one of the laser beams coincide with the other laser beam.

Figure 3:
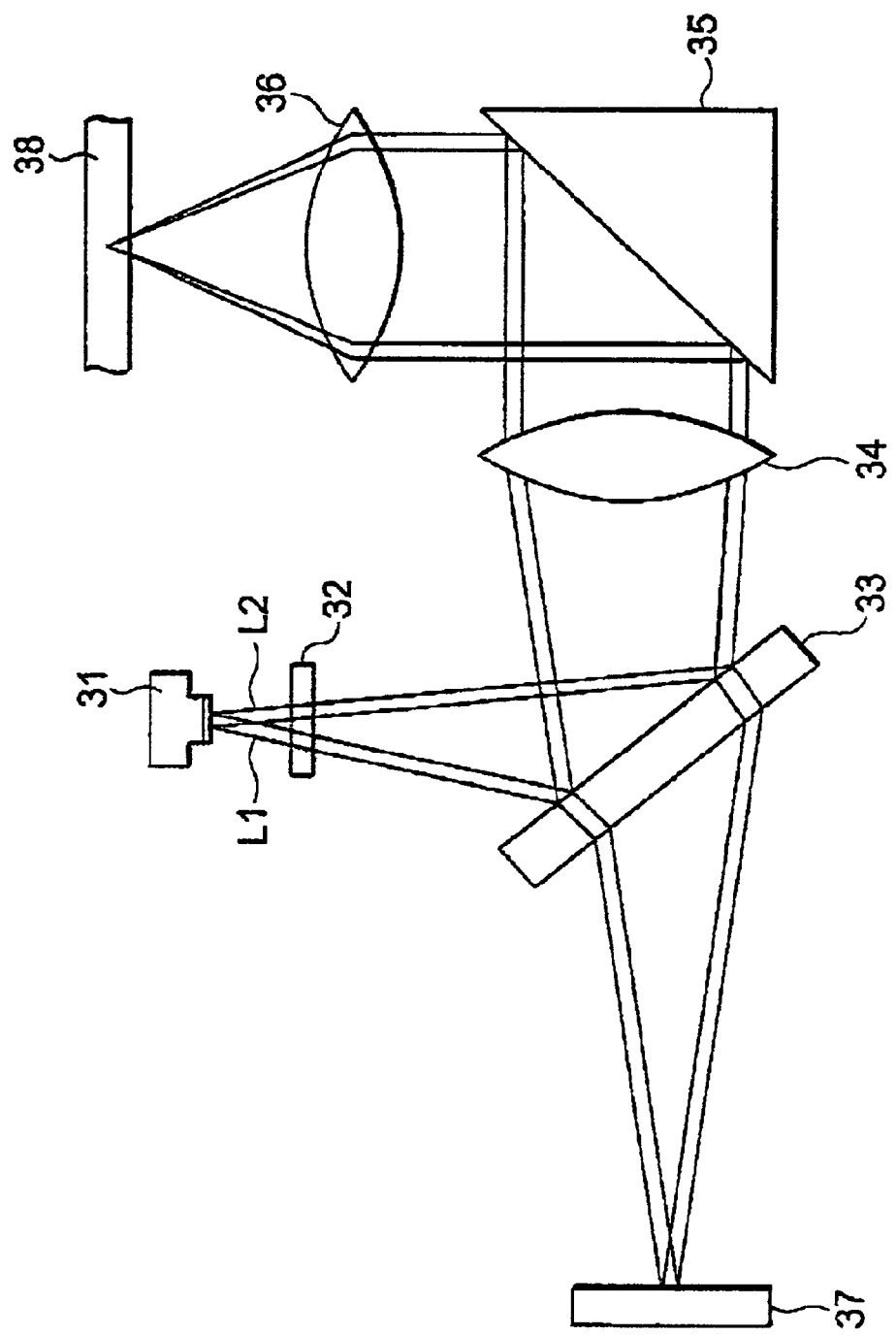
FIG. 3 is a schematic view of an optical pickup according to a preferred embodiment of this invention.
Figure 4:
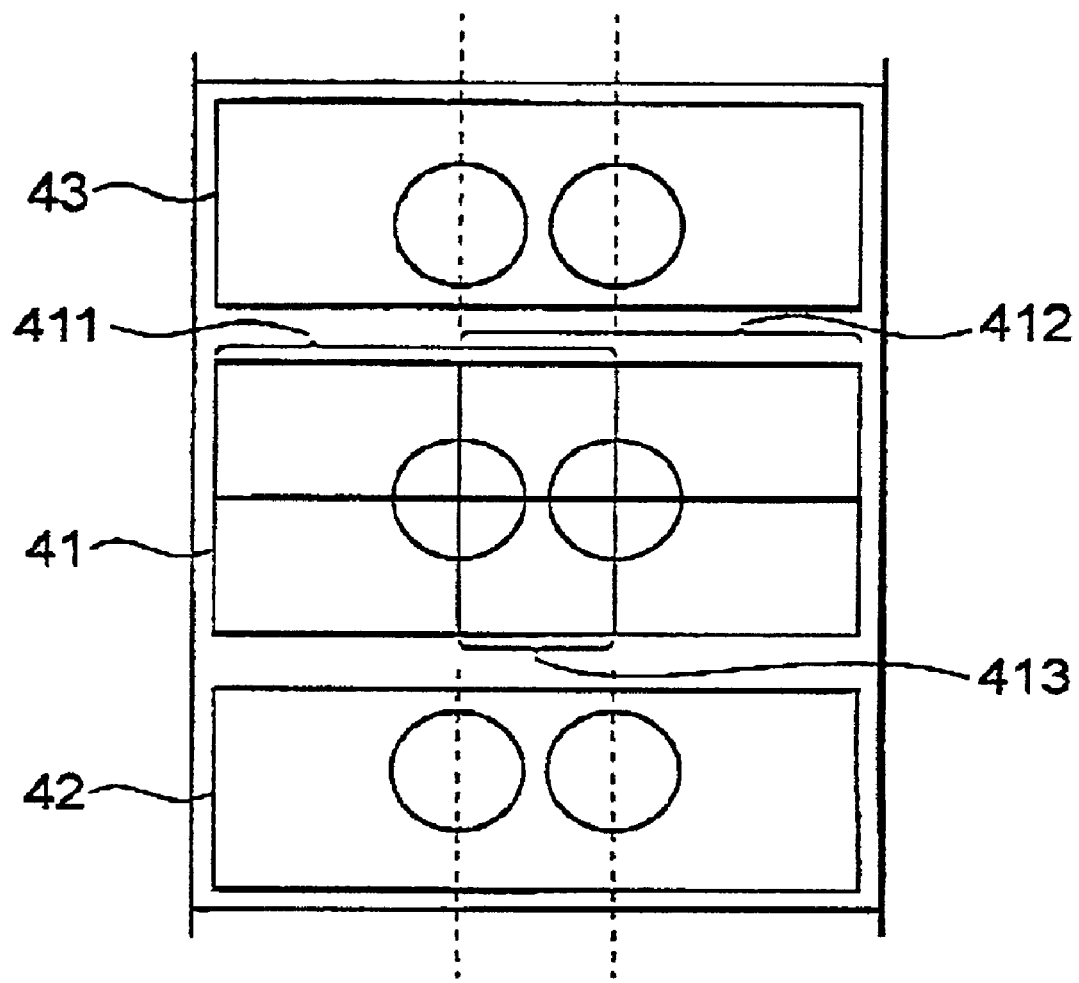
FIG. 4 is a schematic view of a photo sensing area pattern of a photo detector used in the optical pickup of FIG. 3.

Referring to FIGS. 3 and 4, the description will proceed to an optical pickup according to a preferred embodiment of this invention.

FIG. 3 is a system constitution diagram of the optical pickup which is as a two wavelength corresponding optical pickup.

In FIG. 3, the two wavelength corresponding optical pickup comprises a two wavelength laser 31, a grating (GRT) 32, a polarizing beam splitter (PBS) 33, a collimating lens (CL) 34, a rising mirror (FM) 35, an object lens (OL) 36, and a photo detector (PD) 37.

The two wavelength laser 31 includes a semiconductor chip on which first and second laser diodes (not shown) are integrated. The first laser diode produces a first laser beam L1 which has a first optical axis and a wavelength of about 650 nm and which is used for playing a DVD. The second laser diode produces a second laser beam L2 which has a second axis and a wavelength of about 780 nm and which is used for playing a CD. A distance between the first and the second laser diodes (or emitting points) is relatively smaller. The distance is, for example, equal to about 100 nm and can be made with precision of 1 $\mu$m.

The grating 32 divides the first and the second laser beams into first and second three divided laser beams, respectively.

The polarizing beam splitter 33 has a reflectance of 50% and a transmissivity of 50% against both of wavelengths of 650 nm and 780 nm. Accordingly, the polarizing beam splitter 33 reflects the first and the second divided laser beams at a rate of 50 percent towards the collimating lens 34. Moreover, the polarizing beam splitter 33 at a rate of 50 percent passes return laser beams mentioned below through therein toward the photo detector 37 regardless of whether the returning laser beams are originated from the first laser beams or the second laser beams.

The collimating lens 34 collimates the laser beams reflected from the polarizing beam splitter 33 to form parallel beams and lead the parallel beams to the rising mirror 35.

The rising mirror 35 reflects the parallel beams from the collimating lens 34 and changes a traveling direction of the parallel beams at an angle of 90 degrees to lead the parallel beams to the object lens 36.

The object lens 36 condenses the parallel beams from the rising mirror 35 on the recording layer of the optical disc 38.

The optical disc 38 reflects the condensed laser beams condensed by the object lens 36 according to the pits of the recording layer. The laser beams reflected from the optical disc 38 returns to the polarizing beam splitter 33 through the object lens 36, the rising mirror 35 and the collimating lens 34 as the return laser beams. The polarizing beam splitter 33 passes the return laser beams at a rate of 50 percent through therein to the photo detector 37.

As illustrated in FIG. 4, the photo detector 37 has a photo sensing area pattern formed by three photodiodes 41, 42 and 43. The photodiodes 41, 42 and 43 detect the return laser beams and produce electrical signals in response to optical strength of the return laser beams. The photodiode 41 receives the center laser beam of the return laser beams. The photodiodes 42 and 43 receive the side laser beams of the return laser beams.

The photodiode 41 has first and second photo sensing areas 411 and 412, which include a common area 413 common to both of the first and the second photo sensing areas 411 and 412. The first and the second photo sensing areas 411 and 412 selectively operate. The first photo sensing area 411 operates when the first laser diode emits the first laser beam LI while the second photo sensing area 412 operates when the second laser diode emits the second laser beam L2. That is, the first photo sensing area 411 is used for detecting the center laser beam originated from the first laser beam L1 while the second photo sensing area 412 is used for detecting the center laser beam originated from the second laser beam L2. Switching between the first and the second photo sensing areas 411 and 412 is, for example, performed by means of a changeover switch (not shown). Each of the first and the second photo sensing areas 411 and 412 serves as a fourfold photodiode.

The photodiode 42 has a single photo sensing area. Though the photodiode 42 may have two photo sensing areas like the photodiode 41, the two photo sensing areas are unnecessary for the photodiode 42 because the photodiodes 42 and 43 merely detect the quantity of the side laser beam. The photodiode 43 is similar to the photodiode 42.

Next, an operation of the optical pickup is described soon with referring to FIGS. 3 and 4.

The two wavelength laser 31 alternatively emits the first laser beam L1 or the second laser beam L2. That is, when the optical disc 38 is the DVD, the first laser diode is selectively driven. On the other hand the second laser diode is selectively driven when the optical disc 38 is the CD. The first laser diode and the second laser diode are arranged so as to face to the same direction and to be about 100 $\mu$m apart from each other. Accordingly, the first laser beam L1 and the second laser beam L2 have optical axes which are parallel to each other and which are distant from each other.

When either of the laser beam L1 or L2 emitted from the two wavelength laser diode 31 reaches the grating 32, the grating 32 divides the laser beam L1 or L2 into three of the divided laser beams. The divided laser beams travel to the polarizing beam splitter 33.

When the divided laser beams reach the polarizing beam splitter 33, the polarizing beam splitter 33 passes fractions of the divided laser beams through therein and reflects the remains of the divided laser beams. The divided laser beams passing through the polarizing beam splitter 33 are absorbed and are not used in the optical pickup. The divided laser beams reflected by the polarizing beam splitter 33 travel to the collimating lens 34.

The collimating lens 34 collimates the divided laser beams from the polarizing beam splitter 33 to produce the collimated laser beams. The collimated laser beams travel to the rising mirror 35.

The rising mirror 35 reflects the collimated laser beams to lead the collimated laser beams to the object lens 36.

The object lens 36 condenses the collimated laser beams on the recording layer of the optical disc 38. That is, the condensed laser beams condensed by the object lens 36 are applied to the optical disc 38.

The optical disc 38 reflects the condensed laser beams according the pits of the recording layer. The returning laser beams reflected by the optical disc 38 returns to the polarizing beam splitter 33 through the object lens 36, the rising mirror 35, and collimating lens 34.

The polarizing beam splitter 33 reflects fractions of the returning laser beams and passes the remains of the returning laser beams through therein to lead the returning laser beams passed through the polarizing beam splitter 33 to the photo detector 37.

The photo detector 37 detects the return laser beams by the use of the photodiodes 41, 42, and 43 when the return laser beams are originated from the first laser beam L1. On the other hand, the photo detector 37 detects the return laser beams by the use of the photodiodes 41, 42, and 43 when the return laser beams are originated from the second laser beam L2. In each case, the photo detector 37 produces the electric signals in response to the strength of the return laser beams.

Thus, the optical pickup can deal with both of the DVD and the CD.

As mentioned above, the optical pickup can detect the return laser beams by the use of the single photo detector 37 regardless of the origin of the return laser beams. The optical pickup has a simple construction because it has the single laser 31, the single grating 32 and the single polarizing beam splitter 33. The simple construction improves reliability of the optical pickup and reduces both of manufacturing steps and cost.

While this invention has thus far been described in conjunction with the preferred embodiment thereof, it will readily be possible for those skilled in the art to put this invention into practice in various other manners. For example, the collimating lens 34, the rising mirror 35, and the object lens 36 may be disposed so that the divided laser beams passing through the polarizing beam splitter 33 are led to the optical disc 38. In this case, e photo detector 37 detects the return laser beams reflected by the polarizing beam splitter 33.

Moreover, a cylindrical lens may be disposed between the polarizing beam splitter 33 and the photo detector 37 to expand the return laser beams in a direction and to improve a detecting precision.

Furthermore, it is unnecessary that the optical axes of the first and the second laser beams L1 and L2 are parallel to each other. The optical axes may, for instance, intersect to each other. In this case, if the optical axes intersect to each other again at an incident surface of the collimating lens 34, the photo detector 37 can detect the return laser beams like the optical pickup illustrated in FIG. 3.

What is claimed is:

1. An optical pickup for applying a reading laser beam to an optical disc and for detecting a returning laser beam reflected from said optical disc, said optical pickup comprising:

a two wavelength laser having first and second light sources to emit first and second laser beams, respectively, for alternatively applying one of said first laser beam and said second laser beam to said optical disc as said reading laser beam, said first and said second laser beams having optical axes parallel to a first direction and having different wavelengths, a polarizing beam splitter disposed adjacent to said two wavelength laser in the first direction for one of partially passing and partially reflecting said reading laser beam from said two wavelength laser to lead said reading laser beam to said optical disc, and for one of partially reflecting and partially passing said returning laser beam formed by reflecting said reading laser beam with said optical disc to lead said returning laser beam in a second direction different from said first direction, a photo detector disposed adjacent to said polarizing beam splitter in the second direction and having a predetermined photo sensing area pattern for detecting said returning laser beam traveling in the second direction from said polarizing beam splitter regardless of which one of the first laser beam and the second laser beam forms the returning laser, and a grating disposed between said two wavelength laser and said polarizing beam splitter for dividing said reading laser beam into three divided laser beams, wherein said photo detector comprises three photodiodes which respectively correspond to said three divided laser beams, and which form said photo sensing area pattern, and wherein a middle one of said photodiodes comprises first and second photo sensing areas each of which serves as four divisional photodiodes, and each of the first and the second photo sensing areas receives a middle one of said three divided laser beams originating from a respective one of said first laser beam and said second laser beam.

2. The optical pickup as claimed in claim 1, wherein said first sensing area includes a portion in common with said second sensing area.

* * * * *